Feb. 14, 1956     H. L. DUNKLEE     2,734,297
DECORATIVE PINE CONE
Filed April 2, 1954
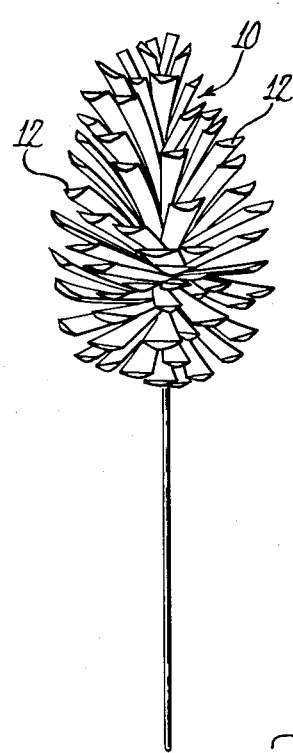
Fig. 1
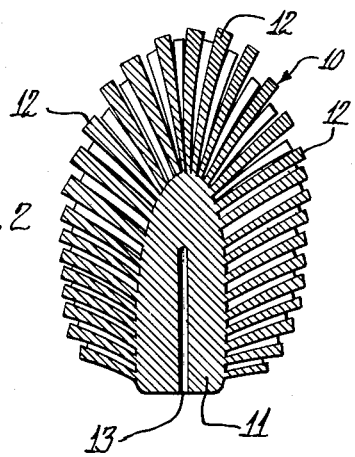
Fig. 2
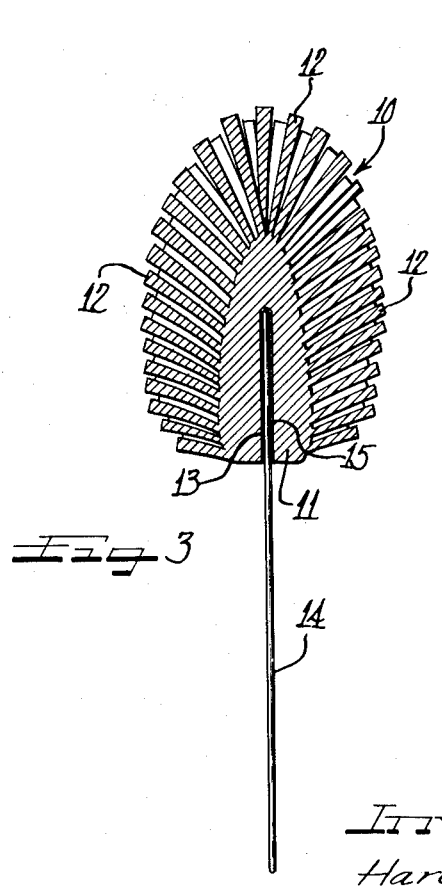
Fig. 3
Inventor
Harold L. Durklee
By Will, Sherman, Meroni, Gross & Simpson Attys

United States Patent Office 2,734,297
Patented Feb. 14, 1956

2,734,297

DECORATIVE PINE CONE

Harold L. Dunklee, Munising, Mich.

Application April 2, 1954, Serial No. 420,476

1 Claim. (Cl. 41—13)

The present invention relates to a decorative article and to a method of making the same. More particularly, the invention relates to an article of decoration made from a cone of a coniferous plant.

In recent years, the use of pine cones and similar cones of coniferous plants in floral decorations and the like has increased considerably. Indeed, at holiday times, such as Christmas, pine cones are not only used to decorate Christmas trees, center pieces for table decorations or the like, but are also widely employed in floral arrangements even to the point of being popularly included in women's corsages.

Cones of coniferous plants per se, however, do not lend themselves to being easily arranged with or affixed to most floral arrangements or similar decorations, especially where it is desired to have the arrangement in a hanging position, such as in a wreath attached to a door or wall, or in a woman's corsage. This is due primarily to the fact that nature has failed to provide cones of coniferous plants with any appendage or other suitable means by which the cones may be attached to another article or object.

Heretofore, means for attaching pine cones to floral arrangements or the like have not been entirely suitable when the cone is to be attached in a depending manner. The main way in which such cones of coniferous plants have been attached in a depending manner such as for hanging on a wall, has been to wind a length of wire around the body of the cone and then fasten the wire to a small stick or similar article. The stick, then, provides a means by which the cone may be attached to another object. This arrangement, however, has several limitations in that the stick-wire combination does not provide adequate means for securely attaching the cone to another object, and further, the wire wrapped around the body of the cone materially detracts from the aesthetic qualities thereof.

Pine cones have also been provided with a wooden stem or standard. Such an arrangement gives the general appearance of a miniature tree. Further, the prior arrangements are not suitable for attaching the pine cone in a depending manner, such as in floral decorations to be hung on a wall.

Still another means of arranging cones of coniferous plants in floral decorations or the like, has been to produce a pine cone "hedge." In producing this hedge, pine cones are severed longitudinally to provide a plurality of flat members having flat mating surfaces with pine burrs or petals extending around the periphery thereof. These invidiual flat members are adhesively fixed to one another in mating engagement at their flat surfaces, and the resulting elongated "hedge-like" structure is adhesively secured to a base. This "hedge" may be suitably employed in floral decorations resting on a flat surface, but are not suitable for decorations wherein the cones must be attached in a depending manner.

As far as I am aware, no one has proposed any suitable means for attaching pine cones to each other in clusters or to another article in such a manner as to produce a pleasing and decorative result.

It is, therefore, the primary object of this invention to overcome this lack of any natural appendage on pine cones by providing an axially extending stem such as a wire or the like, that can be readily bent without breaking, yet is relatively rigid and strong.

Other objects and advantages of the instant invention will be apparent to those skilled in the art from the following discussion of the annexed sheet of drawings.

In the drawings:

Figure 1 is an elevational view of a pine cone having an axially extending stem mounted therein;

Figure 2 is an exploded view partly in section and partly in elevation, showing the manner in which a stem is mounted in a pine cone or similar article in accordance with the method of the instant invention;

Figure 3 is a view similar to Figure 1, partly in section and partly in elevation, showing the assembled pine cone and stem.

The axially extending stem which is mounted in the pine cones of the instant invention comprises an elongated, deformable or bendable material which is capable of being bent by hand into various shapes and which is capable of retaining the shape into which it is bent.

A good example of such a material is a metal wire, such as iron wire. A stem formed of light-weight iron wire can easily be bent with the fingers into various shapes and configurations. Further, the wire will retain the shape into which it is bent. For instance, wire may be wrapped around the branch of the tree and it will assume and retain the helical shape imparted to it by such wrapping, and the wire will tightly engage the branch until removed. In the same manner a stem formed of a light-weight bendable material, such as iron wire or the like, may be intertwined with or tied to other similar stems, or if desired the stem may be formed into a hook to provide a convenient means for hanging an article to which the stem is attached. Accordingly, the stems of the instant invention may comprise substantially any elongated, light-weight deformable or bendable material which is capable of being affixed to another object as mentioned above. Preferably, the stem comprises a metal wire, such as iron wire, aluminum wire, or similar material. If desired, however plastic rods may also be used for this purpose.

Although the diameter of the stem is not important, and can vary depending upon the size of the cone employed and the decorative purpose to which the cone is to be put, for all practical purposes, wire or similar material ranging in a diameter of from about 12 to 24 gauge, may be effectively employed as attaching means to be mounted in cones of coniferous plants.

As shown on the drawings:

The method of providing a cone of a coniferous plant or similar article with a means for attaching the cone to another object is shown in Figures 1–3. The instant invention, as described herein, relates particularly to the mounting of an attaching stem in a pine cone. It will be appreciated, however, that the cone may consist of the cones of any coniferous plants or other similar articles of nature, such as for example, gum burrs, pods or the like.

Referring now to Figures 1–3, a pine cone 10 as seen therein comprises a conical solid core 11 having a plurality of pine cone petals 12 in opened configuration formed integrally therewith and therearound.

An axially extending centrally disposed bore 13 of a predetermined depth and diameter is provided or formed in the core 11. This bore 13 is preferably formed by drilling out the core 11 by any suitable means. The bore 13 should be sufficiently deep to assure a solid and sturdy foundation for securely mounting a stem in the core 11, as will be hereinafter explained. The diameter of the bore 13 may be substantially equivalent to, but preferably slightly larger than the outer diameter of the stem to be mounted in the core 11 of the pine cone 10 as will be hereinafter described.

The stem 14, as noted previously preferably comprises a length of light-weight deformable or bendable iron wire or similar material, of from about 12 to 24 gauge.

The length of the stem 14 is not critical, so long as a sufficient amount of the stem projects externally from the core 11 a suitable distance to provide adequate means for attaching the cone 10 to another object. Accordingly, it is obvious that the length of the stem 14 may vary within wide ranges, depending upon the decorative purpose to which the cone 10 is to be put.

The mounting of the stem 14 in the bore 13 of the core 11 is preferably effected by means of an adhesive 15. The adhesive 15, which may comprise substantially any suitable adhesive material or cement, is applied to one end of the rod, as shown in Figures 2 and 3. In practice, I prefer to use sodium silicate as the adhesive 15.

The amount of the coating of the adhesive 15 is not important, so long as a sufficient amount is deposited on the end of the stem 14 to assure a firm and secure mounting of the stem 14 in the bore 13. After the adhesive 15 is deposited on the end of the stem 14, such as by dipping the stem 14 in a solution of the adhesive, the stem 14 having the adhesive 15 contained on the end thereof, is inserted into the bore 13 of the core 11 the full length of the depth of said bore 13. The adhesive is then allowed to set, causing the stem 14 to be snugly mounted in the bore 13 of the core 11.

The decorative article thus produced may be left in its natural condition, or it may be painted, stained, or otherwise decorated, such as by dipping, spraying or the like, to enhance its appearance. It will, of course, be appreciated that such painting, staining or the like is optional and does not form a part of the instant invention.

It will be appreciated by those skilled in the art that I have now provided a new and improved means for attaching cones of coniferous plants, or similar articles of nature, to other objects.

It will also be obvious that various changes and modifications may be effected in the instant invention without departing from the novel scope thereof.

I claim as my invention:

A decorative article including a cone of a coniferous plant having a decorative coating thereon and an initially solid core and petals extending from said core, said core having a preformed axially extending bore therein, and a manually bendable wire stem having one end cementitiously anchored securely in said bore with the remainder of the stem projecting from said core, said stem remainder being bendable into engaging relationship with an object to mount the cone on the object in a manner simulating the natural growth of the cone.

References Cited in the file of this patent

UNITED STATES PATENTS

| | | |
|---|---|---|
| 1,678,226 | Leigh | July 24, 1928 |
| 1,773,824 | Scheibner | Aug. 26, 1930 |